(12) United States Patent
Park et al.

(10) Patent No.: US 7,030,955 B2
(45) Date of Patent: Apr. 18, 2006

(54) LIQUID CRYSTAL DISPLAY PANEL OF LINE ON GLASS TYPE AND METHOD OF FABRICATING THE SAME

(75) Inventors: Dae Lim Park, Kyoungsangbuk-do (KR); Seong Soo Hwang, Kumi-shi (KR); Su Hwan Moon, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/978,456

(22) Filed: Nov. 2, 2004

(65) Prior Publication Data

US 2005/0088602 A1 Apr. 28, 2005

Related U.S. Application Data

(62) Division of application No. 10/316,113, filed on Dec. 11, 2002, now Pat. No. 6,829,029.

(30) Foreign Application Priority Data

Dec. 20, 2001 (KR) ............... 2001-81562

(51) Int. Cl.
*G02F 1/13* (2006.01)
(52) U.S. Cl. ..................................... 349/152
(58) Field of Classification Search ................. 349/152
See application file for complete search history.

(56) References Cited

U.S. PATENT DOCUMENTS

| | | | |
|---|---|---|---|
| 6,373,546 B1 * | 4/2002 | Kim ............................. | 349/152 |
| 6,636,288 B1 * | 10/2003 | Kim et al. ................... | 349/139 |
| 6,801,288 B1 * | 10/2004 | Ashizawa et al. ........... | 349/149 |
| 6,849,873 B1 * | 2/2005 | Baek et al. ................... | 257/72 |
| 6,888,585 B1 * | 5/2005 | Kim ............................. | 349/43 |
| 6,943,859 B1 * | 9/2005 | Yoo et al. .................... | 349/139 |
| 2002/0071086 A1 * | 6/2002 | Kim et al. .................. | 349/152 |

* cited by examiner

*Primary Examiner*—James A. Dudek
(74) *Attorney, Agent, or Firm*—McKenna Long & Aldridge LLP

(57) ABSTRACT

It is an object of the present invention to provide a LOG-type liquid crystal display panel and a fabricating method that is adaptive for reducing a line resistance of a LOG-type signal line group within the confined area. A LOG-type liquid crystal display panel according to one aspect of the present invention includes a picture display part having a plurality of liquid crystal cells, each of which is arranged at each intersection area between gate lines and data lines; and line on glass type signal lines, being provided at an outer area of the picture display part by a line on glass system, for applying driving signals required for drive integrated circuits for driving the gate lines and the data lines, wherein said any one signal line of the line on glass type signal lines is provided by different metal layers formed between the insulating films and connected with each other in parallel.

2 Claims, 7 Drawing Sheets

LIQUID CRYSTAL DISPLAY PANEL OF LINE ON GLASS TYPE AND METHOD OF FABRICATING THE SAME

This application is a divisional of prior application Ser. No. 10/316,113, filed Dec. 11, 2002 now U.S. Pat No. 6,829,029.

This application claims the benefit of Korean Patent Application No. 2001-81562, filed on Dec. 20, 2001, which is hereby incorporated by reference for all purposes as if fully set forth herein.

BACKGROUND OF THE INVENTION

1. Field of the Invention

The present invention relates to a liquid crystal display, and more particularly to a liquid crystal display panel of line on glass (LOG) type and a fabricating method thereof that is adaptive for minimizing line resistance of LOG-type patterns provided on the liquid crystal display panel.

2. Description of the Related Art

Generally, a liquid crystal display (LCD) controls a light transmittance of a liquid crystal using an electric field to display a picture. To this end, the LCD includes a liquid crystal display panel having liquid crystal cells arranged in a matrix type, and a driving circuit for driving the liquid crystal display panel.

In the conventional liquid crystal display panel, gate lines and data lines are arranged in such a manner to cross each other. The liquid crystal cell is positioned at each area where the gate lines cross the data lines. The liquid crystal display panel is provided with pixel electrodes and a common electrode for applying an electric field to each of the liquid crystal cells. Each pixel electrode is connected, via the source and drain electrodes of a thin film transistor acting as a switching device, to any one of data lines. The gate electrode of the thin film transistor is connected to any one of the gate lines allowing a pixel voltage signal to be applied to the pixel electrodes for each one line.

The driving circuit includes a gate driver for driving the gate lines, a data driver for driving the data lines, a timing controller for controlling the gate driver and the data driver, and a power supply for supplying various driving voltages used in the LCD. The timing controller controls a driving timing of the gate driver and the data driver and applies a pixel data signal to the data driver. The power supply, using input power, generates driving voltages such as a common voltage Vcom, a gate high voltage Vgh and a gate low voltage Vgl, etc, which are needed in the liquid crystal display. The gate driver sequentially applies a scanning signal to the gate lines to sequentially drive the liquid crystal cells on the liquid crystal display panel one line by one line. The data driver applies a pixel voltage signal to each of the data lines whenever the scanning signal is applied to any one of the gate lines. Accordingly, the LCD controls the light transmittance by an electric field applied between the pixel electrode and the common electrode in accordance with the pixel voltage signal for each liquid crystal cell, to thereby display a picture.

The data driver and the gate driver are directly connected to the liquid crystal display panel and integrated into a plurality of integrated circuits (ICs). Each of the data drive IC and the gate drive IC are mounted in a tape carrier package (TCP) for connection to the liquid crystal display panel by a tape automated bonding (TAB) system, or mounted directly onto the liquid crystal display panel by a chip on glass (COG) system. The printed circuit board includes a data PCB and a gate PCB.

The drive ICs are connected, via the TCP, to the liquid crystal display panel by the TAB system and receive control signals and direct current voltages inputted from the exterior over signal lines formed on a printed circuit board (PCB) connected to the TCP. The drive ICs are also connected to each other. More specifically, the data drive ICs are connected, in series, via signal lines formed on the data PCB, and commonly receive control signals from the timing controller, a pixel data signal and driving voltages from the power supply. The gate drive ICs are connected, in series, via signal lines formed on the gate PCB, and commonly receive control signals from the timing controller and driving voltages from the power supply.

The drive ICs mounted onto the liquid crystal display panel by the COG system are connected to each other by a line on glass (LOG) system in which signal lines are mounted on the liquid crystal display panel, that is, on a lower glass, and receive control signals from the timing controller and driving voltages from the power supply.

Recently, even when the drive ICs are connected to the liquid crystal display panel by the TAB system, the LOG system is employed to eliminate the PCB, and permits the manufacture of a thinner liquid crystal display. Accordingly, signal lines for connection to the gate drive ICs require relatively small signal lines, are provided on the liquid crystal display panel by the LOG system and eliminate the need for the gate PCB. In other words, the gate drive ICs of TAB system are connected, in series, to each other over signal lines mounted onto the lower glass of the liquid crystal display panel, and commonly receive control signals and driving voltage signals, which are hereinafter referred to as "gate driving signals".

For example, as shown in FIG. 1, the liquid crystal display omitting the gate PCB by utilizing LOG-type signal wiring includes a liquid crystal display panel 1, a plurality of data TCPs 8 connected between the liquid crystal display panel 1 and a data PCB 12, a plurality of gate TCPs 14 connected to other side of the liquid crystal display panel 1, data drive ICs 10 mounted in the data TCPs 8, and gate drive ICs 16 mounted in the gate TCPs 14.

The liquid crystal display panel 1 includes a lower substrate 2 provided with various signal lines and a thin film transistor array, an upper substrate 4 provided with a color filter array, and a liquid crystal injected between the lower substrate 2 and the upper substrate 4. Such a liquid crystal display panel 1 is provided with a picture display area 21 that consists of liquid crystal cells provided at intersections between gate lines 20 and data lines 18 for the purpose of displaying a picture. At the outer area of the lower substrate 2 located at the outer side of the picture display area 21, data pads extended from the data lines 18 and gate pads extended from the gate lines 20 are positioned. Further, a LOG-type signal line group 26 for transferring gate driving signals applied to the gate drive IC 16 is positioned at the outer area of the lower substrate 2.

The data TCP 8 supports the data drive IC 10, and is provided with input pads 24 and output pads 25 electrically connected to the data drive IC 10. The input pads 24 of the data TCP 8 are electrically connected to the output pads of the data PCB 12 while the output pads 25 are electrically connected to the data pads on the lower substrate 2. Thus, the first data TCP 8 is also provided with a gate driving signal transmission group 22 electrically connected to the LOG-type signal line group 26 on the lower substrate 2. This gate driving signal transmission group 22 applies gate driving signals from the timing controller and the power supply, via the data PCB 12, to the LOG-type signal line group 26.

The data drive ICs 10 convert digital pixel data signals into analog pixel voltage signals to apply them to the data lines 18 on the liquid crystal display panel.

Similarly, the gate TCP 14 is mounted with a gate drive IC 16, and is provided with a gate driving signal transmission line group 28 electrically connected to the gate drive IC 16 and output pads 30. The gate driving signal transmission line group 28 is electrically connected to the LOG-type signal line group 26 on the lower substrate 2, and the output pads 30 are electrically connected to the gate pads on the lower substrate 2.

Each gate drive ICs 16 sequentially applies a scanning signal, that is, a gate high voltage signal Vgh to a gate line 20 in response to input control signals. Further, the gate drive ICs 16 applies a gate low voltage signal Vgl to the gate line 20 in the remaining interval where the gate high voltage signal Vgh is not applied.

The LOG-type signal line group 26 usually consists of signal lines for supplying direct current voltage signals such as a gate high voltage signal Vgh, a gate low voltage signal Vgl, a common voltage signal Vcom, a ground voltage signal GND and a supply voltage signal Vcc and gate control signals such as a gate start pulse GSP, a gate shift clock signal GSC and a gate enable signal GOE. As shown in FIG. 2, a LOG-type signal line group 26 is arranged, in parallel, in a small pattern within a very confined narrow space like a pad portion positioned of an outer area of a picture display part 21.

Referring to the FIG. 2 and FIG. 3, each of the LOG-type signal lines of the LOG-type signal line group 26 includes a gate metal pattern 27 formed on the lower substrate 2, and a protective electrode 36 connected to the gate metal pattern 27, via the contact hole 38 passing through a gate insulating film 32 and a protective film 34. The protective electrode 36 is positioned at a gate pad area and a data pad area contacting the data TCP 8 and the gate TCP 14. The LOG-type signal line group 26 consists of the gate metal pattern simultaneously formed with the gate lines 20. The gate metal is a metal having a relatively large conductive value of 0.046 such as AlNd.

The LOG-type signal line group 26 is formed in a small pattern within a confined area made up of the gate metal having a relatively large conductive value, as shown the FIG. 4, the LOG-type signal line group 26 has a higher resistance value Ri than the signal lines formed in a copper film on an existent gate PCB. Further, the resistance value of the LOG-type signal line group 26 is in proportion to the line length. That is, the line resistance value increases, the farther from the data PCB 12, to attenuate a gate-driving signal. As a result, gate driving signals transferred over the LOG-type signal line group 26 are distorted due to the line resistance value of signal line group 26, causing a deterioration in the quality of a picture displayed on the picture display part 21.

Furthermore, a voltage difference occurs from a gate-driving signal applied for each gate drive IC 16 due to the line resistance value of the LOG-type signal line group 26. Since the line resistance value varies according to the length of the LOG-type signal line group 26 and increases as the LOG-type signal line group 26 is further from the data PCB 12, a gate-driving signal is attenuated. Due to a difference of gate driving signals applied for each gate drive IC 16, a cross-line phenomenon occurs between horizontal line blocks connected to different gate drive ICs 16 at the picture display part 21, causing a division of the field of display.

This cross-line phenomenon between the horizontal line blocks is caused by a gate low voltage Vgl of a plurality of gate driving signals supplied at different levels for each gate drive TCP 14, since each gate drive IC 16 due to a line resistance of the LOG-type signal line group 26. A distortion of the gate low voltage Vgl in the gate driving signals supplied over the LOG-type signal line group 26 greatly affects picture quality of the picture display part 21. The gate low voltage Vgl allows a pixel voltage charged in the liquid crystal cell to be maintained until the next pixel voltage is charged. Thus, the charged pixel voltage varies when the gate low voltage Vgl is distorted.

In order to prevent an attenuation of a gate driving signal, particularly a gate low voltage caused by a line resistance of the LOG-type signal line group 26, the LOG-type signal line group 26 must have a large sectional view or a small resistivity to attenuate a resistance component. However, since an outer area of the picture display part 21 provided with the LOG-type signal line group 26 is confined, there exists a limit in enlarging a sectional area of the LOG-type signal line group 26. Also, since the LOG-type signal line group 26 is formed from a gate metal layer, there exists a limit in reducing the conductive value. Therefore, a scheme for reducing a line resistance of the LOG-type signal line group 26 arranged in a small pattern within the confined area is required.

SUMMARY OF THE INVENTION

Accordingly, the present invention is directed to liquid crystal display panel of line on glass type and method of fabricating the same that substantially obviates one or more of the problems due to limitations and disadvantages of the related art.

An advantage of the present invention is to provide a LOG-type liquid crystal display panel according to one embodiment of the present invention includes a picture display part having a plurality of liquid crystal cells, each of which is arranged at each intersection area between gate lines and data lines, and line on glass type signal lines, provided at an outer area of the picture display part by a line on glass system, applying driving signals required to drive integrated circuits that driving the gate lines and the data lines, and any one signal line of the line on glass type signal lines is provided by different metal layers formed between the insulating films and connected with each other in parallel.

In the line on glass type liquid crystal display panel according to the invention, the line on glass type signal line is formed between the gate insulating films and the protective films, via the contact hole passing through the gate insulating films and the protective films, and including the gate metal layer and the transparent conductive layer connected in parallel.

In the line on glass type liquid crystal display panel according to the invention, the line on glass type signal line is formed between the gate insulating films and is provided at a gate metal layer and a source/drain metal layer connected in parallel, via the contact hole passing through the gate insulating films.

Another advantage of the present invention is to provide the line on glass type signal line having a gate metal pattern, a source/drain metal pattern formed between the gate metal pattern and the gate insulating films, a transparent conductive material pattern formed between the source/drain metal pattern and the protective film, via contact hole passing through the gate insulating, source/drain metal pattern and the protective film, and connected with the gate metal pattern and the source/drain metal pattern, in parallel.

The line on glass type signal lines provide driving signals required in the gate drive integrated circuit for driving the gate lines and a common voltage required in a common electrode of the picture display part.

Specifically, a gate low voltage signal line for supplying a gate low voltage signal to the line on glass type signal lines is provided by different metal layers formed between the insulating films and connected with each other in parallel.

The gate low voltage signal line is arranged by a gate metal pattern provided side by side with the other line on glass type signal lines, and a transparent conductive material pattern provided between the gate metal pattern, the gate insulating films and the protective films, connected in parallel via the contact hole passing through the gate insulating films and the protective films, and overlapping with the other line on glass type signal lines to create the largest area in confined area.

Alternatively, the gate low voltage signal line is arranged according to a gate metal pattern provided side by side with the other line on glass type signal lines, and a source/drain metal pattern provided between the gate metal pattern and the gate insulating films, connected in parallel via the contact hole passing through the gate insulating films, and overlapped with the other line on glass type signal lines to have the largest area in confined area.

Further, the gate low voltage signal line is arranged according to a gate metal pattern provided side by side with the other line on glass type signal lines, a source/drain metal pattern provided between the gate metal pattern and the gate insulating films, connected in parallel via the contact hole passing through the gate insulating films, and overlapping the other line on glass type signal lines to have the largest area in confined area. Additionally, the transparent conductive material pattern provided between the source/drain metal pattern and the protective films has the largest area in confined area, connected with the gate metal pattern and the source/drain metal pattern via contact hole passing through the gate insulating films, with the source/drain metal pattern and the protective films.

A method of fabricating a line on glass type liquid crystal display panel comprising the steps of forming a gate metal pattern of the line on glass type signal lines, along with the gate electrode and the gate lines of the thin film transistor, by depositing a gate metal onto a lower substrate and then patterning it. Then forming an active layer of the thin film transistor by entirely coating a gate insulating film and depositing a semiconductor material and then patterning them, and forming source/drain electrodes and data lines of the thin film transistor, by depositing a source/drain metal and then patterning the metal. Next, forming a contact hole for exposing pads of the gate lines and the data lines, the drain electrode of the thin film transistor, and pads of gate metal pattern of the line on glass type signal line after entirely coating the protective film, and forming a pixel electrode connected to the drain electrode, a protective electrode connected to the pads of the gate line and the data line, and a transparent conductive material pattern overlapping with a gate metal pattern of the line on glass type signal line and connected to the pads of the line on glass signal lines, by depositing a transparent conductive material and then patterning the transparent conductive material.

A method of fabricating a line on glass type liquid crystal display panel comprising the steps of forming a gate metal pattern of the line on glass type signal lines, with the gate electrode and the gate lines formed from the thin film transistor, by depositing a gate metal onto a lower substrate and then patterning the metal. Next, forming an active layer of the thin film transistor by entirely coating a gate insulating film and depositing a semiconductor material and then patterning the semiconductor material. Next, forming source/drain pattern overlapping with the gate metal pattern of the line on glass type signal lines with source/drain electrodes and data lines of the thin film transistor, by depositing a source/drain metal and then patterning the metal. Next, forming a contact hole for exposing pads of the gate lines and the data lines, the drain electrode of the thin film transistor, and pads of gate metal pattern of the line on glass type signal line after entirely coating the protective film, and forming a pixel electrode connected to the drain electrode, a protective electrode connected to the pads of the gate line and the data line, and a transparent conductive material pattern connected to the pads of gate metal pattern of the line on glass type signal line and the source/drain metal pattern, by depositing a transparent conductive material and then patterning the transparent conductive material.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to an embodiment of the present invention, example of which is illustrated in the accompanying drawings.

Figure 5:
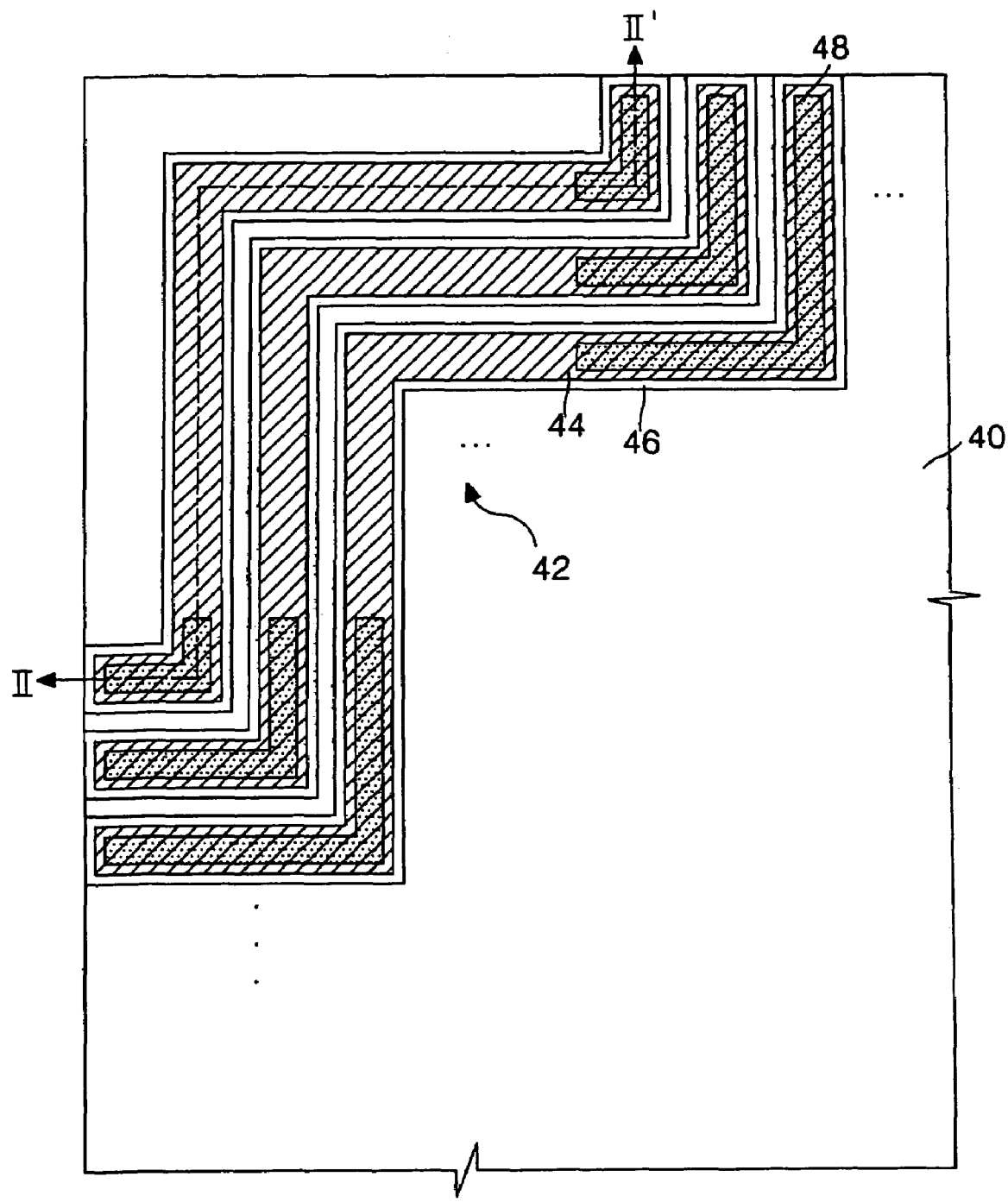
FIG. 5 is an expanded plan view according to an embodiment of the present invention of the line on glass type signal line group.
Figure 6:
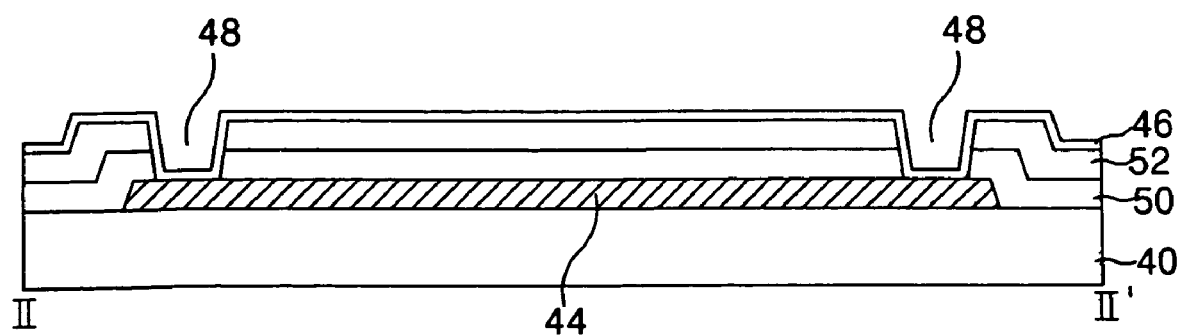
FIG. 6 is a section view of the line on glass type signal line group taken along the II–II' line in FIG. 5.

FIG. 5 is an expanded plan view according to an embodiment of the present invention showing a line on glass type signal line group in a liquid crystal display panel, and FIG. 6 is a section view showing the line on glass type signal line group taken along the II–II' line.

The line on glass type signal lines 42 shown in FIG. 5 and FIG. 6, are provided at the outer area of the picture display part (not shown) having a plurality of liquid crystal cells, for supplying gate driving signals required in the gate drive IC.

For example, each of the LOG-type signal lines 42 applies direct current voltage signals from a power supply such as a gate high voltage signal Vgh, a gate low voltage signal Vgl, a common voltage signal Vcom, a ground voltage signal GND and a supply voltage signal Vcc and gate control signals from a timing controller such as a gate start pulse GSP, a gate shift clock signal GSC and a gate enable signal GOE.

Specifically, each of the LOG-type signal lines 42 includes a gate metal pattern 44 formed on a lower substrate 40 and a transparent conductive material pattern 46 connected to the gate metal pattern 44 via a contact hole 48 passing through a gate insulating film 50 and a protective film 52.

Figure 1:
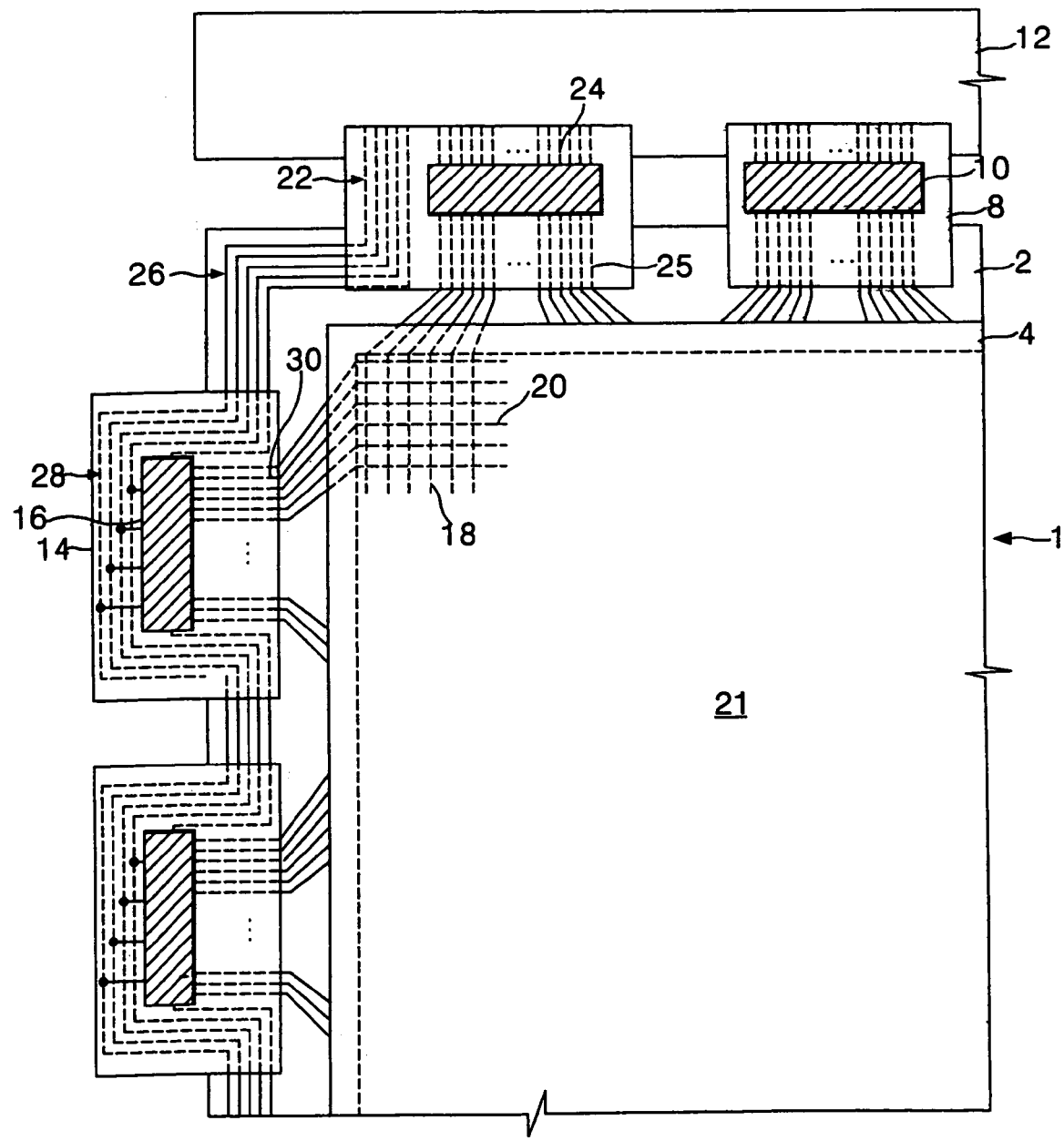
FIG. 1 is a schematic plan view showing a configuration of a conventional line on glass type liquid crystal display.
Figure 2:
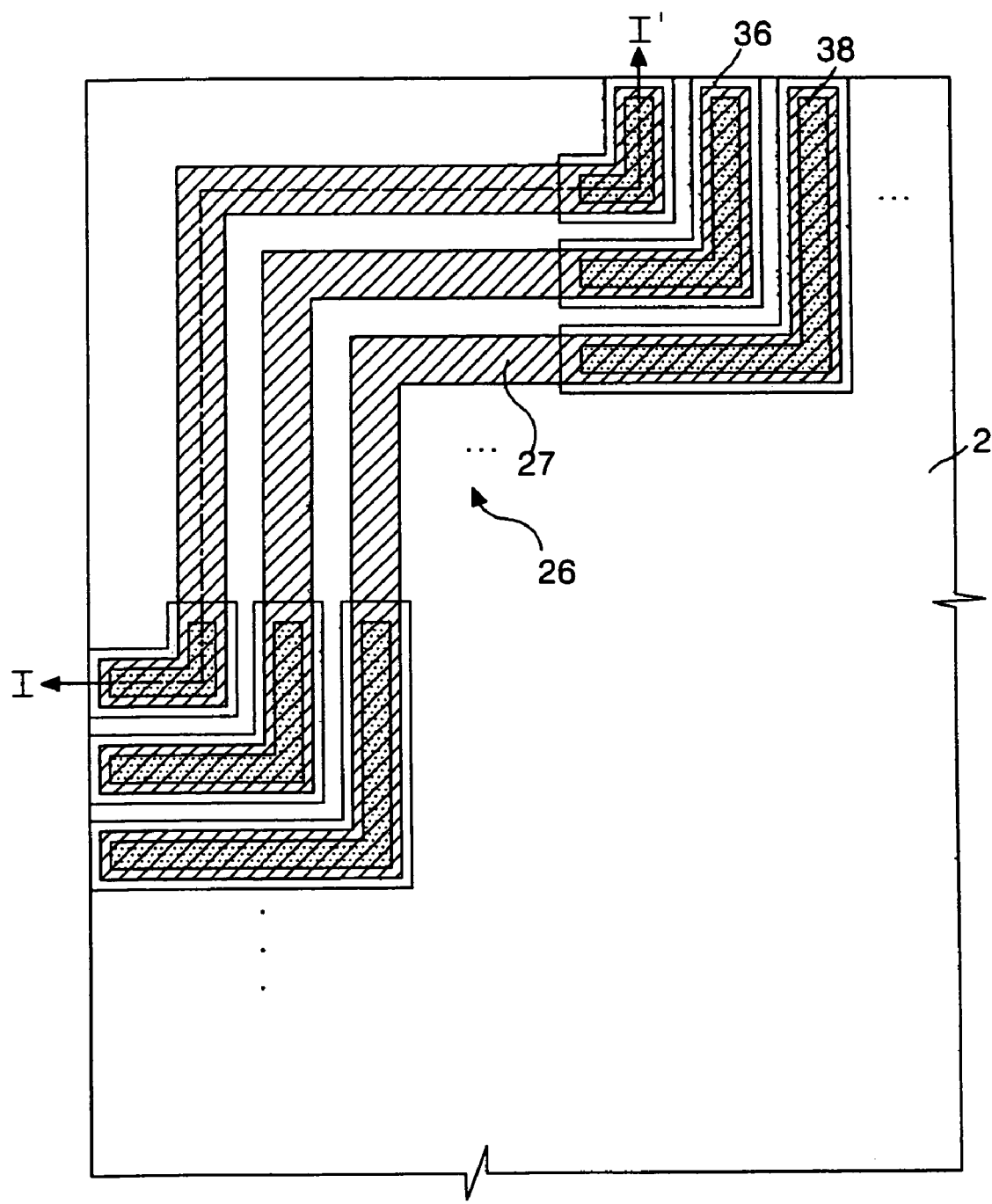
FIG. 2 is an expanded plan view of the line on glass type signal line group shown in FIG. 1.
Figure 3:
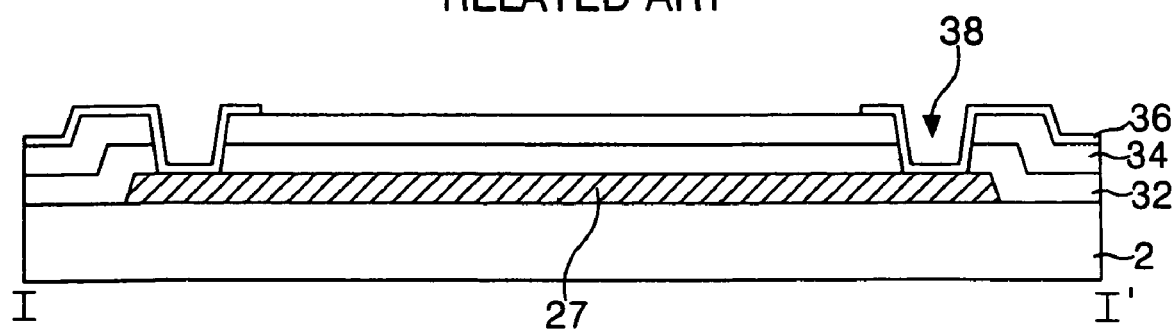
FIG. 3 is a section view of the line on glass type signal line group taken along the I–I' line in FIG. 2.
Figure 4:
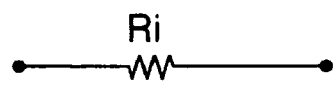
FIG. 4 is a schematic view showing a resistance of same value in the line on glass type signal line in FIG. 3.
Figure 7:
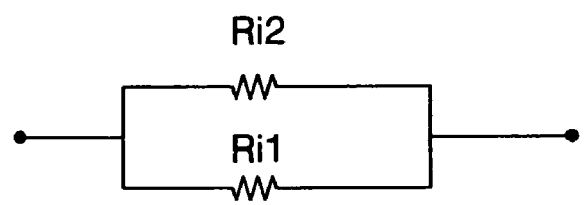
FIG. 7 is a schematic view showing a resistance of same value in the line on glass type signal line in FIG. 6.

The transparent conductive material pattern 46 is connected to the gate TCP and the data TCP to protect the gate metal pattern 44, in the same fashion as the protective electrode 36 that is partially formed only on the pad area as shown FIG. 2. The transparent conductive material pattern 46 is formed to entirely overlap the gate metal pattern 44 with the gate insulating film 50 and the protective film 52 in the center, and with a contact point in the pad area so that the gate metal pattern 44 is connected in parallel to the transparent conductive material pattern 46, as illustrated in FIG. 6. Consequently, as shown in the FIG. 7, each line resistor of the LOG type signal lines 42 includes the first line resistor Ri1 of the gate metal pattern 44 and the second line resistor Ri2 of the transparent conductive material pattern 46 connected to the first line resistor in parallel, and significantly decreases in the line resistance value compared with the conventional gate metal pattern 27 shown in FIG. 2. In other words, the line resistor value decreases remarkably in confined area, when each of the LOG type signal lines 42 has the structure with the gate metal pattern 44 connected to the transparent conductive material pattern 46 in parallel with the insulating film in between.

A method of fabricating such a LOG type signal lines 42 will be described in relation to a process of forming the thin film transistor array on the lower substrate.

A method of fabricating a line on glass type liquid crystal display panel forming the gate metal pattern 44 of the LOG type signal lines, along with gate pads, gate lines and a gate electrode of the thin film transistor, by depositing a gate metal on a lower substrate and then patterning the metal. Then, the metal is entirely coated by a gate insulating film 50 and an active layer of the thin film transistor is formed by depositing an amorphous silicone upon the film and then patterning the amorphous silicon. Depositing a source/drain metal and then patterning the metal to form the source/drain electrode of the thin film transistor, the data lines, and the data pads. After being entirely coated by a protective film 52, the metal, the contact holes are formed through the metal layer exposing the gate pads and the data pads, the drain electrode of the thin film transistor and the pads of the gate metal pattern of the line-on-glass type signal line 42. Then, by depositing a transparent conductive material and then patterning it, a pixel electrode is connected to the drain electrode, a protective electrode connected to the gate pads and the data pads and a transparent conductive material pattern 46 are connected to the pads of the gate metal pattern 44 of the line on glass type signal lines 42.

Alternatively, a method of fabricating a line on glass type liquid crystal display panel employs the gate low voltage signal line. The gate low voltage greatly affects the quality of the picture of the LOG type signal line 42; has a structure with the gate metal pattern 44 connected to the transparent conductive material pattern 46 in parallel. In this case, the gate metal pattern 44 of the gate low voltage signal line is aligned with other LOG type signal lines of the same width, while the transparent conductive material pattern 46 formed on the gate insulating film 50 and the protective film 52 is overlapping the gate metal patterns 44 of the other LOG type signal lines. Employing the maximum enlarged section of transparent conductive material pattern 46 reduces the line resistance value Ri2 of the transparent conductive material pattern 46. Thus, the line resistance value Ri1/Ri2 of the gate low voltage transferred line is greatly reduced at the confined area.

Additionally, a method of fabricating a line on glass type liquid crystal display panel employing the double metal structures with the gate metal pattern 44 connected with the source/drain metal pattern (not shown) in parallel creates the largest reduction in the line resistance value in the LOG type signal lines 42 between the gate insulating films 50. The LOG type signal lines 42 have the parallel structure of the double metal layers with the gate metal pattern 44 and the source/drain metal pattern (not shown) formed in the same pattern and connected through the contact hole (not shown) formed on the gate insulating film 50 in between. Still further, a method of fabricating a line on glass type liquid crystal display panel employs the gate low voltage signal line, which generates the gate low voltage that greatly influences the quality of the picture of the LOG type signal lines 42; has a structure with the gate metal pattern 44 connected to the source/drain metal pattern in parallel. In this case, while the gate metal pattern 44 of the gate low voltage signal line is aligned with other LOG type signal lines of the same width, the source/drain metal pattern formed on the gate insulating film 50 is overlapping the gate metal pattern 44 of other LOG type signal lines. Employing the largest section of source/drain metal pattern reduces the line resistance value. Thus, the greatest reduction of the line resistance value of the gate low voltage signal line is achieved within the confined area.

Figure 8:
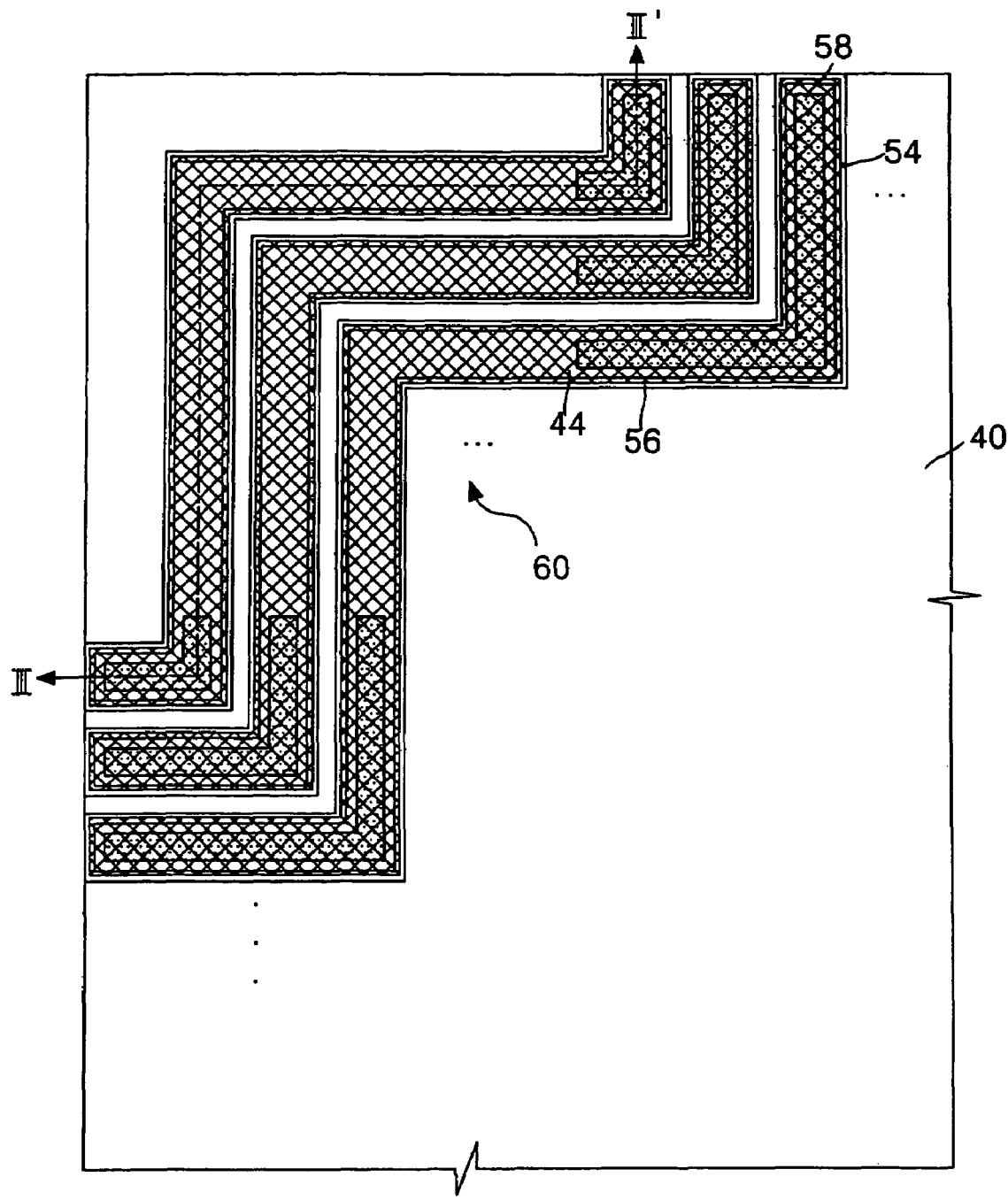
FIG. 8 is an expanded plan view according to another embodiment of the present invention of the line on glass type signal line group.
Figure 9:
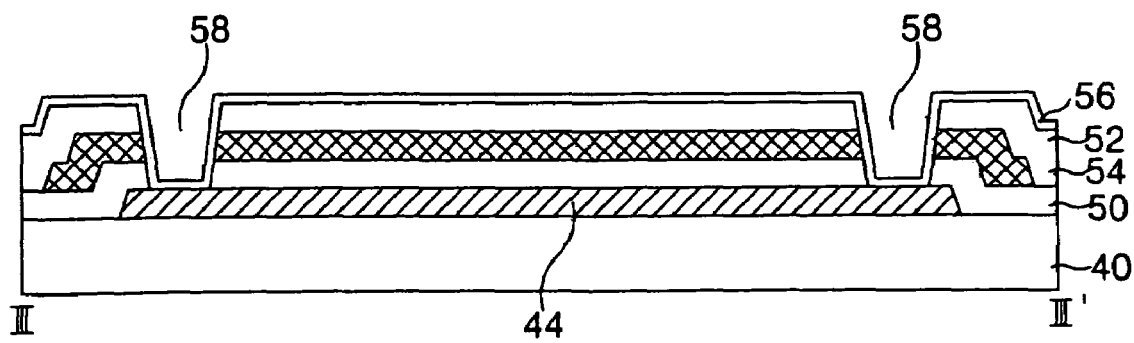
FIG. 9 is a section view of the line on glass type signal line group taken along the III–III' line in FIG. 8.

Next, as shown in FIG. 8 is an expanded plan view of the line on glass type signal line group in a liquid crystal display panel according to another embodiment of the present invention. FIG. 9 is a section view of the line on glass type signal line group take along the C–C' line is FIG. 8.

The LOG type signal lines 60 as shown in the FIG. 8 and FIG. 9, are provided at an outer area of the picture display part (not shown) having a plurality of liquid crystal cells, and for applying gate driving signals required for gate drive IC. For example, the LOG-type signal lines 60 separately supply direct current voltage signals such as a gate high voltage signal Vgh, a gate low voltage signal Vgl, a common voltage signal Vcom, a ground voltage signal GND and a supply voltage signal Vcc and gate control signals such as a gate start pulse GSP, a gate shift clock signal GSC and a gate enable signal GOE.

Specifically, each of the LOG-type signal lines 60, with the gate metal pattern 44 formed on the lower substrate 40, the source/drain metal pattern 54 formed with the gate pattern 44 and the gate insulating 50 in between, and the contact hole 58 passing through the gate insulating film 50, the source/drain metal pattern 50 and the protective film 52, includes the transparent conductive material pattern 56 connected with the gate metal pattern 44 and the source/drain metal pattern 54.

Still referring to FIG. 8, the source/drain metal pattern 54 is formed to overlap the gate metal pattern 44, with the gate insulating film 50 in between. The transparent conductive material pattern 56 is formed to overlap the source/drain metal pattern 54, with the protective film 52 in between.

Figure 10:
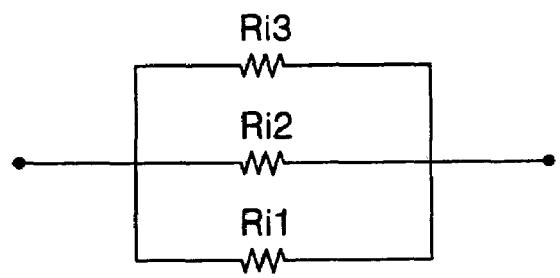
FIG. 10 is a schematic view showing a resistance of same value in the line on glass type signal line in FIG. 9.

Specifically, the transparent conductive material pattern 56 is formed with the contact hole passing through the gate insulating film 50, the source/drain metal pattern 54 and the protective film 52 in pad area, from the structure with the gate metal pattern 44 connected with the source/drain metal pattern 54 in parallel. Accordingly, the transparent conductive material pattern 56 makes contact inside with the source/drain metal pattern 54. Therefore, as shown in FIG. 10, each of the line resistance Ri1 of the gate metal pattern 44, the second line resistance Ri2 of the source/drain metal pattern 54, and the third line resistance Ri3 of the transparent conductive material pattern 56, which are connected to each other in parallel, yields a marked decrease in the line resistance value as compared with the gate metal pattern 27 shown in FIG. 2. Thus, each of the LOG-type signal lines 60 greatly decreases the line resistance value in a confined area, with the triple metal layered structure of the gate metal pattern 44 and the source/drain metal pattern 54 and the transparent conductive material pattern 56 connected in parallel with the insulating film in between. The transparent conductive material pattern 56 connects to the gate TCP and the data TCP, protecting the gate metal pattern 44 with the protective electrode 36 partially formed on the pad area shown in FIG. 2.

The following description explains a method of fabricating of the LOG type signal lines 60 of one embodiment of the invention in relation to the thin film transistor array of the lower substrate.

A method of fabricating a line on glass type liquid crystal display panel forms the gate metal pattern 40 of the LOG type signal lines, with the gate lines and the gate pads, by depositing gate metal layers onto a lower substrate 40 and then patterning the gate metal. Then, the metal entirely coats the gate insulating film 50 and forms a channel part of the thin film transistor by depositing semiconductor layers and then patterning the semiconductor layers. Next, the source/drain metal pattern 54 of the LOG type signal lines along with the data lines and the data pads are formed by depositing a source/drain metal layer and then patterning the metal. Then, the contact hole is formed through the insulating film 50 exposing the pads of the gate lines and the data lines, the drain electrode of the thin film transistor, and pads of the gate metal pattern 44 of the line on glass type signal line 42, after entirely coating the protective film 52. The pads of the gate metal pattern 44 are exposed by the contact hole passing through the gate insulating film 50, the source/drain metal pattern 54 and the protective film 52. Then, by depositing a transparent conductive material and then patterning it, a pixel electrode is connected to the drain electrode, a protective electrode connected to the pads of the gate pads and the data pads, and the transparent conductive material pattern 56 are connected to the gate metal pattern 44 and the source/drain metal pattern 54 of the LOG-type signal lines 60.

Alternatively, a method of fabricating line on glass type signal lines 60 employs the gate low voltage signal line. The gate low voltage greatly affects the quality of the picture of the LOG type signal line 60; has a structure with the gate metal pattern 44 connected to the source/drain material pattern 54 and the transparent conductive material pattern 46 in parallel. In this case, while the gate metal pattern 44 of the gate low voltage signal line is aligned with other LOG type signal lines of the same width, the source/drain metal pattern 54 material pattern 46 formed on the gate insulating film 50 and the transparent conductive material pattern 56 formed on the protective film 52 is overlapping the gate metal patterns 44 of other the LOG type signal lines. Employing the largest section of source/drain metal pattern 54 and transparent conductive material pattern 56 reduces the line resistance value Ri2, Ri3 of the source/drain metal pattern 54. Thus, the greatest reduction of line resistance value Ri1//Ri2//Ri3 of the gate low voltage transferred line is achieved within the confined area.

As described above, according to the present invention, the LOG-type liquid crystal display panel greatly decreases their line resistor value in confined area when the LOG type signal lines have the structures which are the double metal layers (the gate metal layers+the transparent conductive layers or the gate metal layers+the source/drain metal layers) or the triple metal layers (the gate metal layers+the source/drain metal layers+the transparent conductive layers), connected in parallel with the insulating film in between. Therefore, employing the LOG-type signal lines of the present invention makes it possible to minimize signal attenuation caused by a resistance value. Specifically, the gate low voltage signal line that greatly influences the quality of the picture is formed into the double or triple metal layers structure connected in parallel with the insulating films in between and is formed from the largest section of the other metal layers excluding the gate metal layers. Thus, it is possible to reduce the line resistance value in confined area. Accordingly, a resistance value of the gate low voltage signal line is minimized and a difference of the gate low voltage supplied for each gate drive IC is minimized, so that it becomes possible to prevent a cross-line phenomenon between horizontal line blocks connected to each drive IC.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a line on glass type liquid crystal display panel including a picture display part having a plurality of liquid crystal cells, each of which is arranged at each intersection area between gate lines and data lines, and line on glass type signal lines provided at an outer area of the picture display part by a line on glass system to apply driving signals required for drive integrated circuits for driving the gate lines, said method comprising the steps of:

forming a gate metal pattern of the line on glass type signal lines, along with the gate electrode and the gate lines of a thin film transistor, by depositing a gate metal onto a lower substrate and then patterning the gate metal;

coating a gate insulating film and forming an active layer of the thin film transistor by depositing a semiconductor material and then patterning the semiconductor metal;

forming source/drain electrodes and data lines of the thin film transistor, by depositing a source/drain metal and then patterning the source/drain metal;

coating a gate protective film and forming at least one contact hole for exposing pads of the gate lines and the data lines, the drain electrode of the thin film transistor, and pads of gate metal pattern of the line on glass type signal line; and forming a pixel electrode connected to the drain electrode, a protective electrode connected to the pads of the gate line and the data line, and a transparent conductive material pattern, overlapping the gate metal pattern of the line on glass type signal line, connected to the pads of the line on glass signal lines by depositing a transparent conductive material and then patterning the transparent conductive material.

2. A method of fabricating a line on glass type liquid crystal display panel including a picture display part having a plurality of liquid crystal cells, each of which is arranged at each intersection area between gate lines and data lines, and line on glass type signal lines provided at an outer area of the picture display part by a line on glass system to apply driving signals required for drive integrated circuits for driving the gate lines, said method comprising the steps of:

forming a gate metal pattern of the line on glass type signal lines, along with the gate electrode and the gate lines of the thin film transistor, by depositing a gate metal onto a lower substrate and then patterning the gate metal;

coating a gate insulating film and forming an active layer of the thin film transistor by depositing a semiconductor material and then patterning the semiconductor material;

forming source/drain pattern overlapped with the gate metal pattern of the line on glass type signal lines with source/drain electrodes and data lines of the thin film transistor, by depositing a source/drain metal and then patterning the source/drain metal;

coating a gate protective film and forming at least one contact hole for exposing pads of the gate lines and the data lines, the drain electrode of the thin film transistor, and pads of gate metal pattern of the line on glass type signal line; and forming a pixel electrode connected to the drain electrode, a protective electrode connected to the pads of the gate line and the data line, and a transparent conductive material pattern connected to the pads of gate metal pattern of the line on glass type signal line and the source/drain metal pattern, by depositing a transparent conductive material and then patterning the transparent conductive material.

* * * * *